(12) United States Patent
Sakamaki

(10) Patent No.: US 6,504,336 B2
(45) Date of Patent: Jan. 7, 2003

(54) MOTOR CONTROLLER FOR ELECTRIC POWER STEERING SYSTEM

(75) Inventor: Masahiko Sakamaki, Yao (JP)

(73) Assignee: Koyo Seiko Co., Ltd., Osaka (JP)

( * ) Notice: Subject to any disclaimer, the term of this patent is extended or adjusted under 35 U.S.C. 154(b) by 3 days.

(21) Appl. No.: 09/748,275

(22) Filed: Dec. 27, 2000

(65) Prior Publication Data
US 2001/0005121 A1 Jun. 28, 2001

(30) Foreign Application Priority Data
Dec. 28, 1999 (JP) .......................... 11-374269

(51) Int. Cl.⁷ .............................. H02P 1/24; H02P 3/18; H02P 1/42; H02P 5/28; H02P 7/36
(52) U.S. Cl. ....................... 318/727; 318/806
(58) Field of Search ................. 318/722, 727, 318/800, 803, 806–808

(56) References Cited
U.S. PATENT DOCUMENTS 5,670,854 A * 9/1997 Matsuura et al.
5,701,066 A * 12/1997 Matsuura et al.
5,963,007 A * 10/1999 Toyozawa et al.
5,969,500 A * 10/1999 Ishikawa et al.

* cited by examiner

Primary Examiner—Jeffrey Donels
(74) Attorney, Agent, or Firm—Rabin & Berdo, P.C.

(57) ABSTRACT

A motor controller for an electric power steering system which performs a steering assist operation by applying a torque generated by an electric motor to a steering mechanism. The controller includes: a current command value setting circuit for setting a current command value indicative of an electric current to be applied to the electric motor; a d-q command value setting circuit for setting a d-axis current command value and a q-axis current command value in a d-q coordinate system on the basis of the current command value; and a voltage controlling circuit for controlling a voltage to be applied to the electric motor on the basis of the d-axis current command value and the q-axis current command value.

8 Claims, 4 Drawing Sheets

MOTOR CONTROLLER FOR ELECTRIC POWER STEERING SYSTEM

BACKGROUND OF THE INVENTION

1. Field of the Invention

The present invention relates to a motor controller for an electric power steering system which performs a steering assist operation by applying a torque generated by an electric motor to a steering mechanism.

2. Description of Related Arts

Electric power steering systems are conventionally known which are adapted to transmit a torque generated by an electric motor such as a three-phase brushless motor to a steering mechanism to perform a steering assist operation. A motor controller for such an electric power steering system has a construction as shown in FIG. 4.

The motor controller includes a three-phase alternating current coordinate transformation section 91 for converting a current command value i* (effective value) into vectors in a three-phase alternating current coordinate system, i.e., a U-phase current command value $i_{ua}^*$ and a V-phase current command value $i_{va}^*$, on the basis of an angle $\theta_{re}$ of a rotor of a motor M. The current command value i* is determined on the basis of a steering torque or the like applied to a steering wheel. The rotor angle $\theta_{re}$ is detected by a rotor angle detecting circuit 92 on the basis of an output signal of a resolver R provided in association with the motor M.

The U-phase current command value $i_{ua}^*$ and the V-phase current command value $i_{va}^*$ are inputted to subtractors 93u and 93v, respectively. An output of a U-phase current detecting circuit 94u for detecting a U-phase current $i_{ua}$ actually flowing through a U-phase of the motor M and an output of a V-phase current detecting circuit 94v for detecting a V-phase current $i_{va}$ actually flowing through a V-phase of the motor M are applied to the subtractors 93u and 93v, respectively. Therefore, a deviation of the U-phase current $i_{ua}$ from the U-phase current command value $i_{ua}^*$ and a deviation of the V-phase current $i_{va}$ from the V-phase current command value $i_{va}^*$ are outputted from the subtractors 93u and 93v, respectively.

The deviations outputted from the subtractors 93u and 93v are respectively applied to a U-phase current PI (proportional integration) controlling section 95u and a V-phase current PI controlling section 95v. Further, the U-phase current PI controlling section 95u and the V-phase current PI controlling section 95v receive a correction gain determined by a PI gain correcting section 96 on the basis of a rotor angular velocity $\omega_{re}$ which is the rate of a change in the rotor angle $\theta_{re}$. The U-phase current PI controlling section 95u and the V-phase current PI controlling section 95v respectively determine a U-phase voltage command value $V_{ua}^*$ and a V-phase voltage command value $V_{va}^*$ on the basis of the deviations inputted from the subtractors 93u and 93v and the correction gain inputted from the PI gain correcting section 96.

The rotor angular velocity $\omega_{re}$ is determined by a rotor angular velocity calculating section 97 on the basis of the rotor angle $\theta_{re}$ detected by the rotor angle detecting circuit 92.

The U-phase voltage command value $V_{ua}^*$ and the V-phase voltage command value $V_{va}^*$ are inputted to a three-phase PWM (pulse width modulation) section 98. The U-phase voltage command value $V_{ua}^*$ and the V-phase voltage command value $V_{va}^*$ are also inputted to a W-phase voltage command value calculating section 99. The W-phase voltage command value calculating section 99 determines a W-phase voltage command value $V_{wa}^*$ by subtracting the U-phase voltage command value $V_{ua}^*$ and the V-phase voltage command value $V_{va}^*$ from zero, and applies the W-phase voltage command value $V_{wa}^*$ thus calculated to the three-phase PWM section 98. That is, the three-phase PWM section 98 receives the U-phase voltage command value $V_{ua}^*$, the V-phase voltage command value $V_{va}^*$ and the W-phase voltage command value $V_{wa}^*$ inputted thereto.

The three-phase PWM section 98 generates PWM signals $S_u$, $S_v$ and $S_w$ which correspond to the U-phase voltage command value $V_{ua}^*$, the V-phase voltage command value $V_{va}^*$ and the W-phase voltage command value $V_{wa}^*$, respectively, and outputs the PWM signals $S_u$, $S_v$, $S_w$ thus generated to a power circuit P. Thus, the power circuit P applies voltages $V_{ua}$, $V_{va}$ and $V_{wa}$ according to the PWM signals $S_u$, $S_v$ and $S_w$ to the U-phase, the V-phase and the W-phase, respectively, of the motor M, which in turn generates a torque required for the steering assist.

The U-phase current command value $i_{ua}^*$ and the V-phase current command value $i_{va}^*$ are sinusoidally varied in accordance with a change in the rotor angle $\theta_{re}$. The U-phase current $i_{ua}$ and the V-phase current $i_{va}$ are sinusoidal electric currents which are sinusoidally varied in accordance with the change in the rotor angle $\theta_{re}$. With a higher rotation speed of the motor M, the changes in the U-phase current $i_{ua}$ and the V-phase current $i_{va}$ cannot follow the changes in the U-phase current command value $i_{ua}^*$ and the V-phase current command value $i_{va}^*$, so that phase offsets may occur between the U-phase current $i_{ua}$ and the U-phase current command value $i_{ua}^*$ and between the V-phase current $i_{va}$ and the V-phase current command value $i_{va}^*$. If such phase offsets occur, the motor M fails to generate a torque of a proper magnitude, thereby deteriorating the responsiveness of the steering assist and the convergence of the steering wheel. Therefore, the steering feeling may be deteriorated.

Another problem associated with the conventional motor controller is a difficulty in detecting an abnormality such as an offset which causes an electric current to flow through the motor M even if the current command value i* is zero. That is, the U-phase current $i_{ua}$ and the V-phase current $i_{va}$, which are sinusoidal electric currents, instantaneously become zero (or cross zero) depending on the rotor angle $\theta_{re}$. For accurate detection of the offset, it is necessary to constantly monitor the rotor angle $\theta_{re}$ so as to acquire the U-phase current $i_{ua}$ and the V-phase current $i_{va}$ at a time point other than a zero-cross point, or to calculate an effective value of the electric current flowing through the motor M on the basis of the acquired U-phase current $i_{ua}$ and V-phase current $i_{va}$.

SUMMARY OF THE INVENTION

It is a first object of the present invention to provide a motor controller for an electric power steering system which ensures an improved steering feeling.

It is a second object of the invention to provide motor controller for an electric power steering system which features easy detection of an abnormality such as an offset.

A motor controller according to the present invention is a motor controller (C) for an electric power steering system which performs a steering assist operation by applying a torque generated by an electric motor (M) to a steering mechanism (1), the motor controller comprising: a current command value setting circuit (61, 62) for setting a current command value ($i_a^*$) indicative of an electric current to be applied to the electric motor; a d-q command value setting circuit (66) for setting a d-axis current command value ($i_{da}^*$) and a q-axis current command value ($i_{qa}^*$) in a d-q coordinate system on the basis of the current command value set by the current command value setting circuit; and a voltage controlling circuit for controlling a voltage to be applied to the electric motor on the basis of the d-axis current command value and the q-axis current command value set by the d-q command value setting circuit. The parenthesized alphanumeric characters denote corresponding components and the like in the following embodiment, but the embodiment is not intended to be limitative of the present invention.

In accordance with the invention, the d-axis current command value and the q-axis current command value in the d-q coordinate system are determined on the basis of the current command value set by the current command value setting circuit, and the motor is controlled on the basis of the d-axis current command value and the q-axis current command value thus set. The d-axis current command value and the q-axis current command value defined in the d-q coordinate system are direct current values irrelevant to a rotor angle of the motor. Therefore, there is no possibility that an output torque of the motor is reduced due to a phase offset between the current command value and an electric current actually flowing through the motor, unlike the conventional motor controller adapted to control the motor on the basis of a current command value defined in a three-phase alternating current coordinate system. Accordingly, the responsiveness of the steering assist and the convergence of the steering wheel can be improved for drastic improvement of the steering feeling as compared with the conventional controller.

The motor controller preferably further comprises: a current detecting circuit (41, 41u, 41v) for detecting three-phase alternating currents actually flowing through the electric motor; and a three-phase AC/d-q coordinate transformation circuit (68) for converting the three-phase alternating currents detected by the current detecting circuit into a d-axis current ($i_{da}$) and a q-axis current ($i_{qa}$) in the d-q coordinate system. In this case, the voltage controlling circuit is preferably adapted to perform a feedback control on the voltage applied to the electric motor on the basis of the d-axis current command value and the q-axis current command value set by the d-q command value setting circuit, and the d-axis current and the q-axis current outputted from the three-phase AC/d-q coordinate transformation circuit.

The voltage controlling circuit preferably comprises: a d-axis deviation calculating circuit (67d) for determining a deviation of the d-axis current outputted from the three-phase AC/d-q coordinate transformation circuit with respect to the d-axis current command value set by the d-q command value setting circuit; a d-axis voltage command value setting circuit (69d, 71d) for setting a d-axis voltage command value ($V_{da}^*$) in the d-q coordinate system on the basis of the deviation determined by the d-axis deviation calculating circuit; a q-axis deviation calculating circuit (67q) for determining a deviation of the q-axis current outputted from the three-phase AC/d-q coordinate transformation circuit with respect to the q-axis current command value set by the d-q command value setting circuit; and a q-axis voltage command value setting circuit (69q, 71q) for setting a q-axis voltage command value ($V_{qa}^*$) in the d-q coordinate system on the basis of the deviation determined by the q-axis deviation calculating circuit.

The motor controller may further comprise a velocity electromotive voltage calculating circuit (70) for determining a velocity electromotive voltage occurring in the electric motor. In this case, the d-axis voltage command value setting circuit and the q-axis voltage command value setting circuit are preferably adapted to determine the d-axis voltage command value and the q-axis voltage command value in consideration of the velocity electromotive voltage determined by the velocity electromotive calculating circuit. Thus, the reduction in the output of the electric motor can be prevented which may otherwise occur due to the velocity electromotive voltage, whereby the steering feeling can further be improved.

The motor controller preferably further comprises an abnormality judging circuit (74) for judging whether or not any abnormality occurs in a control system on the basis of the d-axis current and the q-axis current outputted from the three-phase AC/d-q coordinate transformation circuit.

With this arrangement, the abnormality judging circuit judges whether or not any abnormality occurs on the basis of the d-axis current and the q-axis current outputted from the three-phase AC/d-q coordinate transformation circuit. Since the d-axis current and the q-axis current are direct currents which are irrelevant to the rotor angle, the abnormality judging circuit can acquire the d-axis current and the q-axis current irrelevantly to the rotor angle, and judge whether or not any abnormality is present on the basis of the d-axis current and the q-axis current thus acquired. Thus, the process for the abnormality detection can be simplified with no need for constant monitoring of the rotor angle.

The foregoing and other objects, features and effects of the present invention will become more apparent from the following description of the preferred embodiments with reference to the attached drawings.

DESCRIPTION OF THE PREFERRED EMBODIMENTS

Figure 1:
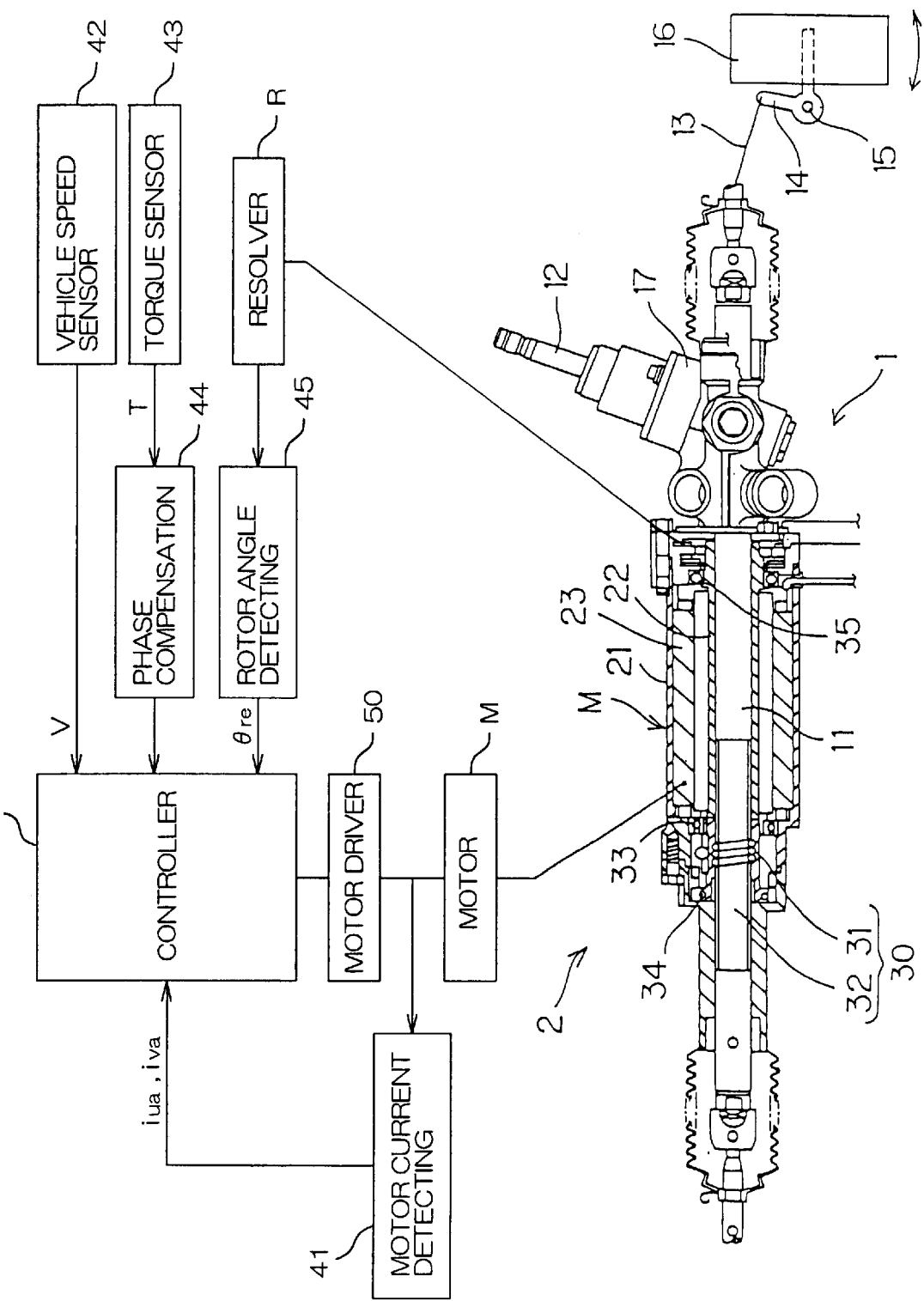
FIG. 1 is a block diagram illustrating the construction of an electric power steering system according to one embodiment of the present invention.

FIG. 1 is a block diagram illustrating the electrical construction of an electric power steering system according to one embodiment of the present invention with a sectional view of a steering mechanism. The steering mechanism 1 includes a rack 11 disposed along the width of a vehicle, a pinion shaft 12 having a pinion portion provided at a distal end thereof in a meshing engagement with the rack 11 within a gear box 17, tie rods 13 rotatably connected to opposite ends of the rack 11, and knuckle arms 14 rotatably connected to ends of the tie rods 13. The knuckle arms 14 are provided rotatably about king pins 15, and steerable vehicle wheels 16 are attached to the knuckle arms 14.

A proximal portion of the pinion shaft 12 is connected to a steering shaft via a universal joint, and a steering wheel is fixed to one end of the steering shaft. With this arrangement, turning of the steering wheel displaces the rack 11 along its length to rotate the knuckle arms 14 around the king pins 15, whereby the orientation of the steerable vehicle wheels 16 is changed.

The electric power steering system 2 has a three-phase brushless motor M provided, for example, in association with the midportion of the rack 11. The motor M has a case 21 fixed to the vehicle, a rotor 22 provided around the rack 11 in the case 21, and a stator 23 surrounding the rotor 22.

A ball nut 31 is coupled to one end of the rotor 22. The ball nut 31 is threadingly engaged with a thread shaft 32 provided in the midportion of the rack 11 via a plurality of balls. Thus, the ball nut 31 and the thread shaft 32 constitute a ball thread mechanism 30. Bearings 33, 34 are interposed between the ball nut 31 and the case 21 of the motor M, and a bearing 35 is interposed between the case 21 and the other end of the rotor 22. With this arrangement, a torque is applied to the rotor 22 when the motor M is energized, and the applied torque is transmitted to the ball nut 31 coupled to the rotor 22. The torque transmitted to the ball nut 31 is converted into a driving force for moving the rack 11 along the width of the vehicle by the ball thread mechanism 30. Thus, the torque generated by the motor M is applied to the steering mechanism 1.

The motor M is feedback-controlled by a controller C. More specifically, the controller C receives an output signal of a motor current detecting circuit 41 for detecting electric currents (U-phase current $i_{ua}$, V-phase current $i_{va}$) flowing through the motor M and an output signal of a vehicle speed sensor 42 for detecting a vehicle speed V. Further, the controller C receives an output signal of a torque sensor 43 for detecting a steering torque T via a phase compensation circuit 44. The phase compensation circuit 44 serves to advance the phase of the output signal of the torque sensor 43 for stabilization of the control system.

The controller C further receives an output signal of a rotor angle detecting circuit 45 for determining a rotor angle $\theta_{re}$ on the basis of an output signal of a resolver R. The rotor angle $\theta_{re}$ is an angle of the rotor (magnetic field) with respect to the position of a U-phase armature coil of the motor M. The controller C determines a current command value for the motor M on the basis of the output signals of the vehicle sensor 42 and the phase compensation circuit 44, and determines a voltage command value on the basis of the current command value and the output signal of the motor current detecting circuit 41 to apply the voltage command value to a motor driver 50. Thus, a proper voltage is applied to the motor M from the motor driver 50, whereby the motor M generates a torque necessary and sufficient for the steering assist.

Figure 2:
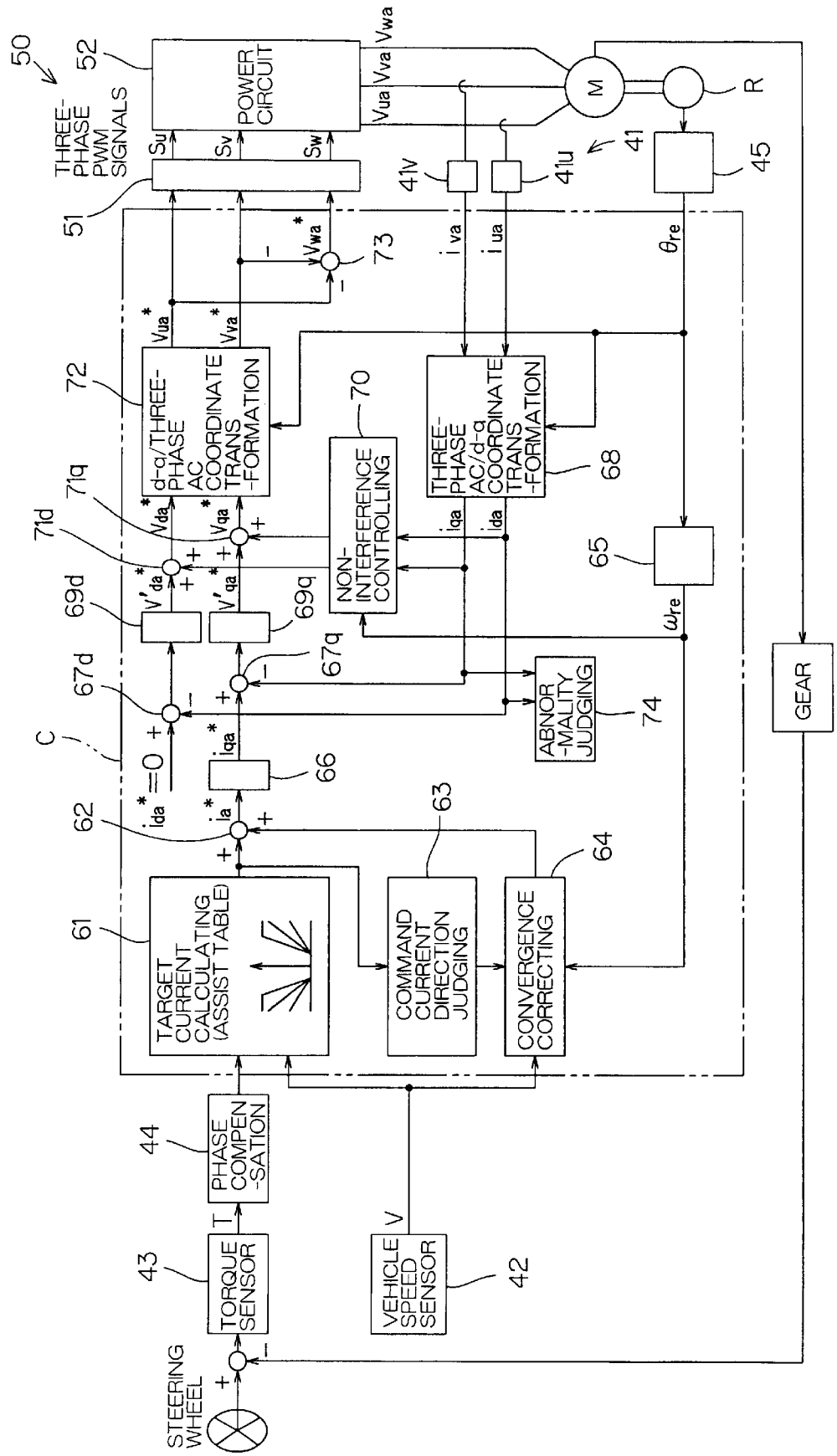
FIG. 2 is a block diagram for explaining the function and construction of a controller (motor controller)

FIG. 2 is a block diagram for explaining the function and construction of the controller C. The controller C comprises a microprocessor including, for example, a CPU, a RAM and a ROM. Functional circuits enclosed by a two-dot-and-dash line in FIG. 2 are realized by causing the CPU to execute programs stored in the ROM.

The controller C includes a target current calculating section 61 for calculating a target current value on the basis of the output signal V of the vehicle speed sensor 42 and the output signal of the phase compensation circuit 44. The target current value outputted from the target current calculating section 61 is inputted to an adder 62 and a command current direction judging section 63. The command current direction judging section 63 judges the sign of the target current value inputted from the target current calculating section 61, and the result of the judgment is applied to a convergence correcting section 64. The target current value has a positive sign when an assist force for a rightward steering operation (a rightward torque) is to be generated by the motor M, and has a negative sign when an assist force for a leftward steering operation (a leftward torque) is to be generated by the motor M.

The output signal V of the vehicle speed sensor 42 and an output signal of a rotor angular velocity calculating section 65 for calculating a rotor angular velocity $\omega_{re}$ on the basis of the rotor angle $\theta_{re}$ detected by the rotor angle detecting circuit 45 are inputted to the convergence correcting section 64. On the basis of these input signals, the convergence correcting section 64 calculates a convergence correction value for improvement of the convergence of the steering wheel, and applies the convergence correction value to the adder 62. The adder 62 adds the convergence correction value inputted from the convergence correcting section 64 to the target current value inputted from the target current calculating section 61 thereby to provide a current command value $I_a^*$ indicative of the amplitude of electric currents (sinusoidal electric currents) to be applied to the U-phase, V-phase and W-phase of the motor M.

The current command value $I_a^*$ provided by the adder 62 is applied to a q-axis current command value calculating section 66. The q-axis current command value calculating section 66 determines a q-axis current command value $i_{qa}^*$ in the d-q coordinate system on the basis of the current command value $I_a^*$.

Figure 3:
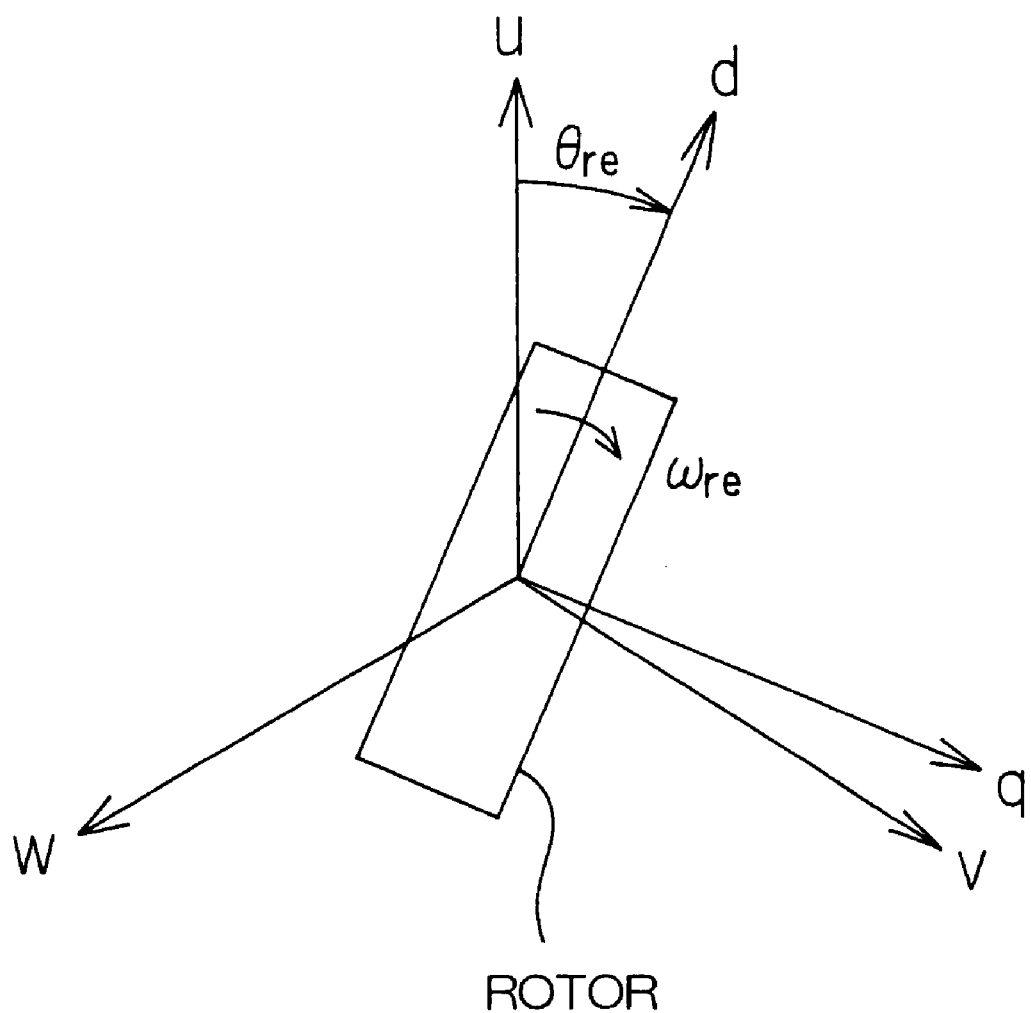
FIG. 3 is a diagram for explaining a d-q coordinate system.
Figure 4:
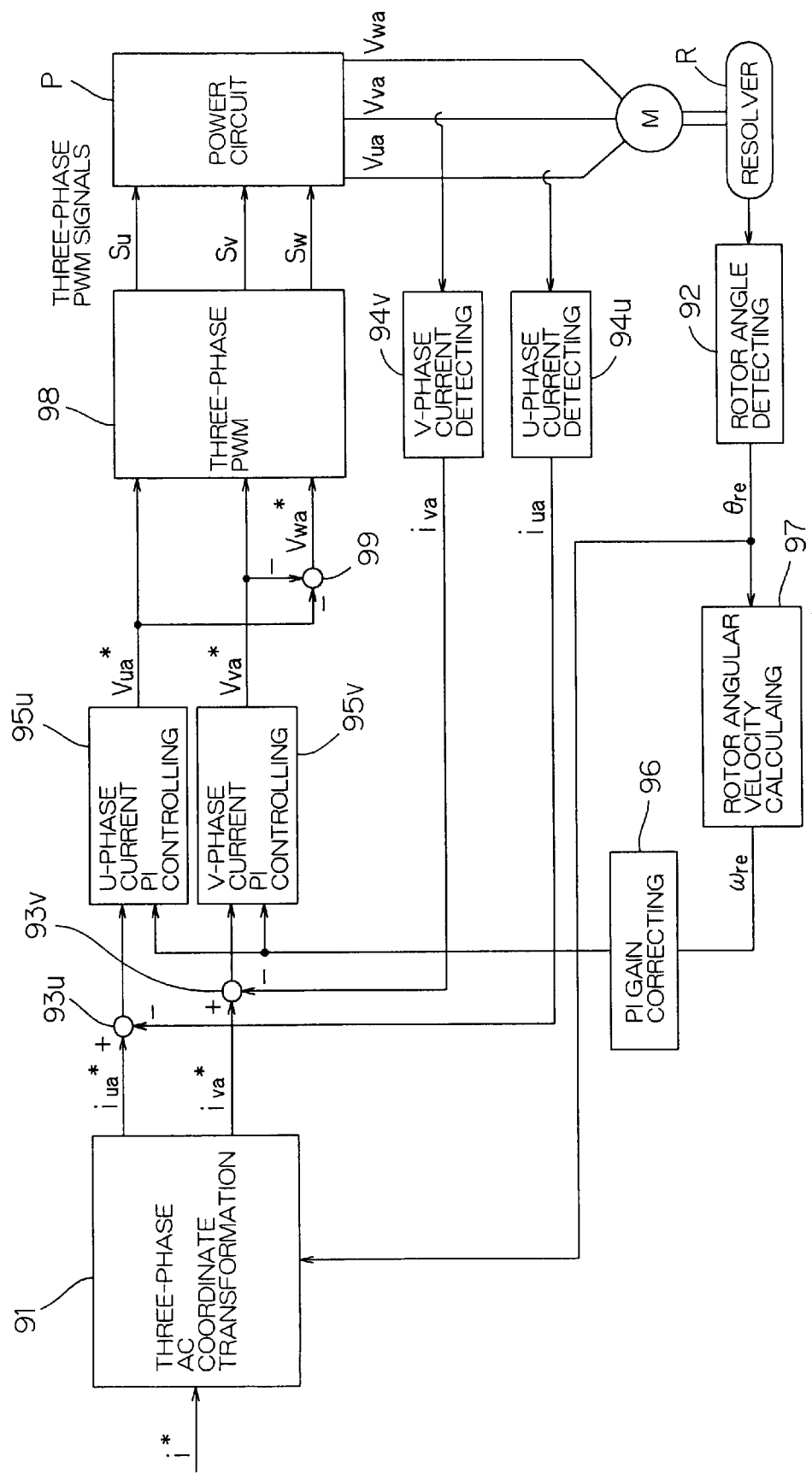
FIG. 4 is a block diagram illustrating the major construction of a motor controller for a conventional power steering system.

The d-q coordinate system is a rotational orthogonal coordinate system having a d-axis and a q-axis which are rotative in synchronism with the rotor (permanent magnet) of the motor M. As shown in FIG. 3, the d-axis extends in the direction of a magnetic flux to be produced by the rotor, and the q-axis extends in the direction of the torque to be generated by the motor M.

A transformation matrix [c] for converting the three-phase alternating current coordinates into the d-q coordinates is as follows:

$$[c] = \sqrt{\frac{2}{3}} \begin{bmatrix} \cos\theta_{re} & \cos\left(\theta_{re} - \frac{2\pi}{3}\right) & \cos\left(\theta_{re} - \frac{4\pi}{3}\right) \\ -\sin\theta_{re} & -\sin\left(\theta_{re} - \frac{2\pi}{3}\right) & -\sin\left(\theta_{re} - \frac{4\pi}{3}\right) \end{bmatrix} \quad (1)$$

Provided that a U-phase current command value, a V-phase current command value and a W-phase current command value obtained through a three-phase division process of the current command value $I_a^*$ is $i_{ua}^*$, $i_{va}^*$ and $i_{wa}^*$, respectively, the d-axis current command value $i_{da}^*$ and the q-axis current command value $i_{qa}^*$ in the d-q coordinate system are expressed by the following equation (2):

$$\begin{bmatrix} i_{da}^* \\ i_{qa}^* \end{bmatrix} = [c] \begin{bmatrix} i_{ua}^* \\ i_{va}^* \\ i_{wa}^* \end{bmatrix} \quad (2)$$

$$= \sqrt{\frac{2}{3}} \begin{bmatrix} \cos\theta_{re} & \cos\left(\theta_{re} - \frac{2\pi}{3}\right) & \cos\left(\theta_{re} - \frac{4\pi}{3}\right) \\ -\sin\theta_{re} & -\sin\left(\theta_{re} - \frac{2\pi}{3}\right) & -\sin\left(\theta_{re} - \frac{4\pi}{3}\right) \end{bmatrix} \begin{bmatrix} i_{ua}^* \\ i_{va}^* \\ i_{wa}^* \end{bmatrix}$$

The U-phase current command value $i_{ua}^*$, the V-phase current command value $i_{va}^*$ and W-phase current command value $i_{wa}^*$ are respectively expressed by the following equations (3), (4) and (5).

$$i_{ua}^* = I_a^* \sin\theta_{re} \tag{3}$$

$$i_{va}^* = I_a^* \sin\left(\theta_{re} - \frac{2\pi}{3}\right) \tag{4}$$

$$i_{wa}^* = I_a^* \sin\left(\theta_{re} - \frac{4\pi}{3}\right) \tag{5}$$

These equations (3), (4) and (5) are substituted into the equation (2), followed by simplification. Then, the d-axis current command value $i_{da}^*$ and the q-axis current command value $i_{qa}^*$ are expressed by the following equation (6):

$$\begin{bmatrix} i_{da}^* \\ i_{qa}^* \end{bmatrix} = \begin{bmatrix} 0 \\ -\sqrt{\frac{3}{2}} I_a^* \end{bmatrix} \tag{6}$$

Therefore, the q-axis current command value calculating section 66 calculates the q-axis current command value $i_{qa}^*$ from the following equation (7):

$$i_{qa}^* = -\sqrt{\frac{3}{2}} I_a^* \tag{7}$$

The q-axis current command value $i_{qa}^*$ calculated by the q-axis current command value calculating section 66 is inputted to the subtractor 67q. The subtractor 67q also receives a q-axis current $i_{qa}$ obtained through the three-phase AC/d-q coordinate transformation of the U-phase current $i_{ua}$ and the V-phase current $i_{va}$ detected by the motor current detecting circuit 41. More specifically, the motor current detecting circuit 41 includes a U-phase current detecting circuit 41u for detecting the U-phase current $i_{ua}$ actually flowing through the U-phase of the motor M, and a V-phase current detecting circuit 41v for detecting the V-phase current $i_{va}$ actually flowing through the V-phase of the motor M. The output signals of the U-phase current detecting circuit 41u and the V-phase current detecting circuit 41v are inputted to the three-phase AC/d-q coordinate transformation section 68, which converts the U-phase current $i_{ua}$ and the V-phase current $i_{va}$ into values based on the d-q coordinate system in accordance with the following equation (8):

$$\begin{bmatrix} i_{da} \\ i_{qa} \end{bmatrix} = [c] \begin{bmatrix} i_{ua} \\ i_{va} \\ i_{wa} \end{bmatrix}$$

$$= \sqrt{\frac{2}{3}} \begin{bmatrix} \cos\theta_{re} & \cos\left(\theta_{re} - \frac{2\pi}{3}\right) & \cos\left(\theta_{re} - \frac{4\pi}{3}\right) \\ -\sin\theta_{re} & -\sin\left(\theta_{re} - \frac{2\pi}{3}\right) & -\sin\left(\theta_{re} - \frac{4\pi}{3}\right) \end{bmatrix} \begin{bmatrix} i_{ua} \\ i_{va} \\ i_{wa} \end{bmatrix}$$

($i_{wa} = i_{ua} - i_{va}$ is substituted therein, followed by simplification)

$$= \sqrt{2} \begin{bmatrix} -\sin\left(\theta_{re} - \frac{2\pi}{3}\right) & \sin\theta_{re} \\ -\cos\left(\theta_{re} - \frac{2\pi}{3}\right) & \cos\theta_{re} \end{bmatrix} \begin{bmatrix} i_{ua} \\ i_{va} \end{bmatrix} \tag{8}$$

Then, the three-phase AC/d-q coordinate transformation section 68 applies the q-axis current $i_{qa}$ obtained through the three-phase AC/d-q transformation to the subtractor 67q.

Therefore, the subtractor 67q outputs a deviation of the q-axis current $i_{qa}$ from the q-axis current command value $i_{qa}^*$.

As can be understood from the above equation (6), it is preferred to set the d-axis current command value $i_{da}^*$ to zero irrespective of the current command value $I_a^*$. Therefore, the d-axis current command value $i_{da}^*$ is always set to zero, and the d-axis current command value "$i_{da}^* = 0$" is inputted to the subtractor 67d. The d-axis current $i_{da}$ obtained through the three-phase AC/d-q coordinate transformation of the U-phase current $i_{ua}$ and the V-phase current $i_{va}$ in accordance with the above equation (8) by the three-phase AC/d-q coordinate transformation section 68 is inputted to the subtractor 67d. Thus, the subtractor 67d outputs a deviation of the d-axis current $i_{da}$ from the d-axis current command value $i_{da}^*$.

The deviations outputted from the subtractors 67d, 67q are respectively applied to a d-axis current PI (proportional integration) controlling section 69d and a q-axis current PI controlling section 69q. The PI controlling sections 69d, 69q perform a PI computation on the basis of the deviations inputted from the subtractors 67d, 67q to determine a d-axis voltage base value $V'_{da}^*$ and a q-axis voltage base value $V'_{qa}^*$.

It is known that a circuit equation based on the d-q coordinate system for the motor M is expressed by the following equation (9):

$$\begin{bmatrix} V_{da} \\ V_{qa} \end{bmatrix} = \begin{bmatrix} R_a + PL_a & -\omega_{re}L_a \\ \omega_{re}L_a & R_a + PL_a \end{bmatrix} \begin{bmatrix} i_{da} \\ i_{qa} \end{bmatrix} + \begin{bmatrix} 0 \\ \omega_{re}\Phi_{fa} \end{bmatrix} \tag{9}$$

wherein $V_{da}$ is a d-axis voltage, $V_{qa}$ is a q-axis voltage, $R_a$ is the resistance of the armature coil, P is a differential operator (d/dt), $L_a$ is the self-inductance of the armature coil, and $\Phi_{fa}$ is the maximum number of interlinkage fluxes of the armature coil in the d-q coordinate system.

By expanding and simplifying the equation (9), the following equations (10) and (11) are obtained.

$$V_{da} = (R_a + PL_a)i_{da} - \omega_{re}L_a i_{qa} \tag{10}$$

$$V_{qa} = (R_a + PL_a)i_{qa} + \omega_{re}(L_a i_{da} + \Phi_{fa}) \tag{11}$$

The second term "$-\omega_{re}L_a i_{qa}$" in the equation (10) and the second term "$\omega_{re}(L_a i_{da} + \Phi_{fa})$" in the equation (11) are velocity electromotive voltages to be generated by the magnetic flux produced by the rotor and the magnetic flux produced by the current flowing through the armature coil. As can be understood from the above equations (10) and (11), the velocity electromotive voltages "$-\omega_{re}L_a i_{qa}$" and "$\omega_{re}(L_a i_{da} + \Phi_{fa})$" influence the d-axis voltage $V_{da}$ and the q-axis voltage $V_{qa}$. Therefore, where the motor M is controlled on the basis of the d-axis voltage base value $V'_{da}^*$ and the q-axis voltage base value $V'_{qa}^*$, the d-axis current $i_{da}$ and the q-axis current $i_{qa}$ obtained through the three-phase AC/d-q coordinate transformation of the output of the motor current detecting circuit 41 do not properly match with the d-axis current command value $i_{da}^*$ and the q-axis current command value $i_{qa}^*$ respectively.

In this embodiment, a non-interference control is performed on the basis of the rotor angular velocity $\omega_{re}$ outputted from the rotor angular velocity calculating section 65 and the d-axis current $i_{da}$ and the q-axis current $i_{qa}$ outputted from the three-phase AC/d-q coordinate transformation section 68 to eliminate the influence of the velocity electromotive voltages "$-\omega_{re}L_a i_{qa}$" and "$\omega_{re}(L_a i_{da} + \Phi_{fa})$".

More specifically, the rotor angular velocity $\omega_{re}$ outputted from the rotor angular velocity calculating section 65 and the d-axis current $i_{da}$ and the q-axis current $i_{qa}$ outputted from the three-phase AC/d-q coordinate transformation section 68 are inputted to a non-interference controlling section 70, which in turn calculates the velocity electromotive voltages "$-\omega_{re}L_a i_{qa}$" and "$\omega_{re}(L_a i_{da}+\Phi_{fa})$". The velocity electromotive voltages "$-\omega_{re}L_a i_{qa}$" and "$\omega_{re}(L_a i_{da}+\Phi_{fa})$" are respectively added to the d-axis voltage base value $V'_{da}*$ and the q-axis voltage base value $V'_{qa}*$ by the adders 71d and 71q, and the calculation results are respectively employed as a d-axis voltage command value $V_{da}*$ and a q-axis voltage command value $V_{qa}*$.

The d-axis voltage command value $V_{da}*$ and the q-axis voltage command value $V_{qa}*$ are inputted to a d-q/three-phase AC coordinate transformation section 72. The d-q/three-phase AC coordinate transformation section 72 also receives the rotor angle $\theta_{re}$ detected by the rotor angle detecting circuit 45, and converts the d-axis voltage command value $V_{da}*$ and the q-axis voltage command value $V_{qa}*$ into command values $V_{ua}*$, $V_{va}*$ based on the three-phase AC coordinate system in accordance with the following equation (12). The resulting U-phase voltage command value $V_{ua}*$ and V-phase voltage command value $V_{va}*$ are inputted to a three-phase PWM section 51 provided in the motor driver 50.

$$\begin{bmatrix} V_{va}^* \\ V_{ua}^* \\ V_{wa}^* \end{bmatrix} = [c]^{-1} \begin{bmatrix} V_{da}^* \\ V_{qa}^* \end{bmatrix} \quad (12)$$

$$= \sqrt{\frac{2}{3}} \begin{bmatrix} \cos\theta_{re} & -\sin\theta_{re} \\ \cos\left(\theta_{re} - \frac{2\pi}{3}\right) & -\sin\left(\theta_{re} - \frac{2\pi}{3}\right) \\ \cos\left(\theta_{re} - \frac{4\pi}{3}\right) & -\sin\left(\theta_{re} - \frac{4\pi}{3}\right) \end{bmatrix} \begin{bmatrix} V_{da} \\ V_{qa} \end{bmatrix}$$

However, a W-phase voltage command value $V_{wa}*$ is not calculated by the d-q/three-phase AC coordinate transformation section 72, but calculated by a W-phase voltage command value calculating section 73 on the basis of the U-phase voltage command value $V_{ua}*$ and the V-phase voltage command value $V_{va}*$ calculated by the d-q/three-phase AC coordinate transformation section 72. More specifically, the W-phase voltage command value calculating section 73 receives the U-phase voltage command value $V_{ua}*$ and the V-phase voltage command value $V_{va}*$ from the d-q/three-phase AC coordinate transformation section 72, and determines the W-phase voltage command value $V_{wa}*$ by subtracting the U-phase voltage command value $V_{ua}*$ and the V-phase voltage command value $V_{va}*$ from zero.

A reason why the W-phase voltage command value $V_{wa}*$ is calculated not by the d-q/three-phase AC coordinate transformation section 72 but by the W-phase voltage command value calculating section 73 is to prevent the CPU from being burdened with the calculation according to the equation (12). Therefore, if the computation speed of the CPU is sufficiently high, the W-phase voltage command value $V_{wa}*$ may be calculated by the d-q/three-phase AC coordinate transformation section 72.

Like the U-phase voltage command value $V_{ua}*$ and the V-phase voltage command value $V_{va}*$, the W-phase voltage command value $V_{wa}*$ calculated by the W-phase voltage command value calculating section 73 is applied to the three-phase PWM section 51. The three-phase PWM section 51 generates PWM signals $S_u$, $S_v$ and $S_w$ which correspond to the U-phase voltage command value $V_{ua}*$, the V-phase voltage command value $V_{va}*$ and the W-phase voltage command value $V_{wa}*$, respectively, and the generated PWM signals $S_u$, $S_v$, $S_w$ are outputted to a power circuit 52. Thus, the power circuit 52 applies voltages $V_{ua}$, $V_{va}$ and $V_{wa}$ according to the PWM signals $S_u$, $S_v$ and $S_w$ to the U-phase, the V-phase and the W-phase, respectively, of the motor M, whereby the motor M generates a torque required for the steering assist.

In accordance with this embodiment, the d-axis current command value $i_{da}*$ and the q-axis current command value $i_{qa}*$ in the d-q coordinate system are determined on the basis of the current command value $I_a*$ set in accordance with the vehicle speed V, the steering torque T and the like, and the motor M is controlled on the basis of the d-axis current command value $i_{da}*$ and the q-axis current command value $i_{qa}*$ thus determined. The d-axis current command value $i_{da}*$ and the q-axis current command value $i_{qa}*$ are irrelevant to the rotor angle $\theta_{re}$ as can be understood from the above equation (6). Accordingly, there is no possibility that the output torque of the motor M is reduced due to a phase offset between the current command value and the electric current actually flowing through the motor M, unlike the conventional controller adapted to control the motor M on the basis of the current command value in the three-phase AC coordinate system. Therefore, the responsiveness of the steering assist and the convergence of the steering wheel can be improved for drastic improvement of the steering feeling as compared with the conventional controller.

In accordance with this embodiment, the velocity electromotive voltage generated in the motor M by the magnetic flux produced by the rotor and the magnetic flux produced by the electric current flowing through the armature coil is calculated, and the d-axis voltage command value $V_{da}*$ and the q-axis voltage command value $V_{qa}*$ are determined in consideration of the velocity electromotive voltage thus calculated (non-interference control). Therefore, the reduction in the output of the motor M can be prevented which may otherwise occur due to the velocity electromotive voltage, whereby the steering feeling can further be improved.

In this embodiment, the motor controller further comprises an abnormality judging section 74 for determining whether or not any abnormality such as an offset occurs. The abnormality judging section 74 is adapted to determine whether or not any abnormality occurs on the basis of the d-axis current $i_{da}$ and the q-axis current $i_{qa}$ outputted from the three-phase AC/d-q coordinate transformation section 68. Provided that the U-phase current $i_{ua}$, the V-phase current $i_{va}$ and the W-phase current $i_{wa}$ each have an amplitude $I_a$, the d-axis current $i_{da}$ and the q-axis current $i_{qa}$ are expressed by the following expression (13), which indicates that the d-axis current $i_{da}$ and the q-axis current $i_{qa}$ are irrelevant to the rotor angle $\theta_{re}$. Therefore, the abnormality judging section 74 acquires the d-axis current $i_{da}$ and the q-axis current $i_{qa}$ irrespective of the rotor angle $\theta_{re}$, and determines whether or not any abnormality is present on the basis of the acquired d-axis current $i_{da}$ and q-axis current $i_{qa}$. In addition, there is no need to calculate the effective value of the electric current flowing through the motor M.

$$\begin{bmatrix} i_{da} \\ i_{qa} \end{bmatrix} = \begin{bmatrix} 0 \\ -\sqrt{\frac{3}{2}} I_a \end{bmatrix} \quad (13)$$

While one embodiment of the present invention has thus been described, the invention can be embodied in any other ways. The aforesaid embodiment employs the PI control, but a PID (proportional integration differential) control may be employed instead of the PI control.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 11-374269 filed to the Japanese Patent Office on Dec. 28, 1999, the disclosure thereof being incorporated herein by reference.

What is claimed is:

1. A motor controller for an electric power steering system which performs a steering assist operation by applying a torque generated by an electric motor to a steering mechanism, the motor controller comprising:
   a current command value setting circuit for setting a current command value indicative of an electric current to be applied to the electric motor;
   a d-q command value setting circuit for setting a d-axis current command value and a q-axis current command value in a d-q coordinate system on the basis of the current command value set by the current command value setting circuit;
   a voltage controlling circuit for controlling a voltage to be applied to the electric motor on the basis of the d-axis current command value and the q-axis current command value set by the d-q command value setting circuit;
   a current detecting circuit for detecting three-phase alternating currents actually flowing through the electric motor; and
   a three-phase AC/d-q coordinate transformation circuit for converting the three-phase alternating currents detected by the current detecting circuit into a d-axis current and a q-axis current in the d-q coordinate system;
   wherein the voltage controlling circuit feedback-controls the voltage applied to the electric motor on the basis of the d-axis current command value and the q-axis current command value set by the d-q command value setting circuit, and the d-axis current and the q-axis current outputted from the three-phase AC/d-q coordinate transformation circuit.

2. A motor controller for an electric power steering system which performs a steering assist operation by applying a torque generated by an electric motor to a steering mechanism, the motor controller comprising:
   a current command value setting circuit for setting a current command value indicative of an electric current to be applied to the electric motor;
   a d-q command value setting circuit for setting a d-axis current command value and a q-axis current command value in a d-q coordinate system on the basis of the current command value set by the current command value setting circuit;
   a voltage controlling circuit for controlling a voltage to be applied to the electric motor on the basis of the d-axis current command value and the q-axis current command value set by the d-q command value setting circuit;
   a current detecting circuit for detecting three-phase alternating currents actually flowing through the electric motor; and
   a three-phase AC/d-q coordinate transformation circuit for converting the three-phase alternating currents detected by the current detecting circuit into a d-axis current and a q-axis current in the d-q coordinate system;
   wherein the voltage controlling circuit includes:
      a d-axis deviation calculating circuit for determining a deviation of the d-axis current outputted from the three-phase AC/d-q coordinate transformation circuit with respect to the d-axis current command value set by the d-q command value setting circuit;
      a d-axis voltage command value setting circuit for setting a d-axis voltage command value in the d-q coordinate system on the basis of the deviation determined by the d-axis deviation calculating circuit;
      a q-axis deviation calculating circuit for determining a deviation of the q-axis current outputted from the three-phase AC/d-q coordinate transformation circuit with respect to the q-axis current command value set by the d-q command value setting circuit; and
      a q-axis voltage command value setting circuit for setting a q-axis voltage command value in the d-q coordinate system on the basis of the deviation determined by the q-axis deviation calculating circuit.

3. A motor controller as set forth in claim 2, further comprising velocity electromotive voltage calculating circuit for determining a velocity electromotive voltage occurring in the electric motor, wherein the d-axis voltage command value setting circuit and the q-axis voltage command value setting circuit determine the d-axis voltage command value and the q-axis voltage command value in consideration of the velocity electromotive voltage determined by the velocity electromotive calculating circuit.

4. A motor controller for an electric power steering system which performs a steering assist operation by applying a torque generated by an electric motor to a steering mechanism, the motor controller comprising:
   a current command value setting circuit for setting a current command value indicative of an electric current to be applied to the electric motor;
   a d-q command value setting circuit for setting a d-axis current command value and a q-axis current command value in a d-q coordinate system on the basis of the current command value set by the current command value setting circuit;
   a voltage controlling circuit for controlling a voltage to be applied to the electric motor on the basis of the d-axis current command value and the q-axis current command value set by the d-q command value setting circuit;
   a current detecting circuit for detecting three-phase alternating currents actually flowing through the electric motor;
   a three-phase AC/d-q coordinate transformation circuit for converting the three-phase alternating currents detected by the current detecting circuit into a d-axis current and a q-axis current in the d-q coordinate system; and
   an abnormality judging circuit for judging whether or not any abnormality occurs in a control system on the basis of the d-axis current and the q-axis current outputted from the three-phase AC/d-q coordinate transformation circuit.

5. An electric power steering system comprising:
   an electric motor which is driven to generate and apply a torque to a steering mechanism for steering assist;

a current command value setting circuit for setting a current command value indicative of an electric current to be applied to the electric motor;

a d-q command value setting circuit for setting a d-axis current command value and a q-axis current command value in a d-q coordinate system on the basis of the current command value set by the current command value setting circuit;

a voltage controlling circuit for controlling a voltage to be applied to the electric motor on the basis of the d-axis current command value and the q-axis current command value set by the d-q command value setting circuit;

a current detecting circuit for detecting three-phase alternating currents actually flowing through the electric motor; and a three-phase AC/d-q coordinate transformation circuit for converting the three-phase alternating currents detected by the current detecting circuit into a d-axis current and a q-axis current in the d-q coordinate system;

wherein the voltage controlling circuit feedback-controls the voltage applied to the electric motor on the basis of the d-axis current command value and the q-axis current command value set by the d-q command value setting circuit, and the d-axis current and the q-axis current outputted from the three-phase AC/d-q coordinate transformation circuit.

6. An electric power steering system comprising:

an electric motor which is driven to generate and apply a torque to a steering mechanism for steering assist;

a current command value setting circuit for setting a current command value indicative of an electric current to be applied to the electric motor;

a d-q command value setting circuit for setting a d-axis current command value and a q-axis current command value in a d-q coordinate system on the basis of the current command value set by the current command value setting circuit;

a voltage controlling circuit for controlling a voltage to be applied to the electric motor on the basis of the d-axis current command value and the q-axis current command value set by the d-q command value setting circuit;

a current detecting circuit for detecting three-phase alternating currents actually flowing through the electric motor; and a three-phase AC/d-q coordinate transformation circuit for converting the three-phase alternating currents detected by the current detecting circuit into a d-axis current and a q-axis current in the d-q coordinate system;

wherein the voltage controlling circuit includes:

a d-axis deviation calculating circuit for determining a deviation of the d-axis current outputted from the three-phase AC/d-q coordinate transformation circuit with respect to the d axis current command value set by the d-q command value setting circuit;

a d-axis voltage command value setting circuit for setting a d-axis voltage command value in the d-q coordinate system on the basis of the deviation determined by the d-axis deviation calculating circuit;

a q-axis deviation calculating circuit for determining a deviation of the q-axis current outputted from the three-phase AC/d-q coordinate transformation circuit with respect to the q-axis current command value set by the d-q command value setting circuit; and a q-axis voltage command value setting circuit for setting a q-axis voltage command value in the d-q coordinate system on the basis of the deviation determined by the q-axis deviation calculating circuit.

7. An electric power steering system as set forth in claim 6, further comprising velocity electromotive voltage calculating circuit for determining a velocity electromotive voltage occurring in the electric motor, wherein the d-axis voltage command value setting circuit and the q-axis voltage command value setting circuit determine the d-axis voltage command value and the q-axis voltage command value in consideration of the velocity electromotive voltage determined by the velocity electromotive calculating circuit.

8. An electric power steering system comprising:

an electric motor which is driven to generate and apply a torque to a steering mechanism for steering assist;

a current command value setting circuit for setting a current command value indicative of an electric current to be applied to the electric motor;

a d-q command value setting circuit for setting a d-axis current command value and a q-axis current command value in a d-q coordinate system on the basis of the current command value set by the current command value setting circuit;

a voltage controlling circuit for controlling a voltage to be applied to the electric motor on the basis of the d-axis current command value and the q-axis current command value set by the d-q command value setting circuit;

a current detecting circuit for detecting three-phase alternating currents actually flowing through the electric motor;

a three-phase AC/d-q coordinate transformation circuit for converting the three-phase alternating currents detected by the current detecting circuit into a d-axis current and a q-axis current in the d-q coordinate system; and an abnormality judging circuit for judging whether or not any abnormality occurs in a control system on the basis of the d-axis current and the q-axis current outputted from the three-phase AC/d-q coordinate transformation circuit.

* * * * *